United States Patent [19]
Katsuma

[11] Patent Number: 5,000,556
[45] Date of Patent: Mar. 19, 1991

[54] BINOCULAR TELESCOPE WITH AUXILIARY LENS SYSTEM

[75] Inventor: Syuji Katsuma, Tokyo, Japan

[73] Assignee: Katsuma Kougakukikai Kabushikikaisha, Tokyo, Japan

[21] Appl. No.: 372,659

[22] Filed: Jun. 28, 1989

[30] Foreign Application Priority Data

Jun. 28, 1988 [JP] Japan ................... 63-86086

[51] Int. Cl.$^5$ ............. G02B 23/00; G02B 15/10; G02B 7/04; G02B 7/14
[52] U.S. Cl. .................... 350/545; 350/559; 350/254; 350/257
[58] Field of Search ............ 350/559, 520, 550–556, 350/254, 247, 257, 545

[56] References Cited

U.S. PATENT DOCUMENTS

| | | | |
|---|---|---|---|
| 841,262 | 1/1907 | Martin | 350/559 |
| 1,818,974 | 8/1931 | Engelmann | 350/520 |
| 2,133,509 | 10/1938 | Hall et al. | 350/520 |
| 5,262,989 | 5/1981 | Waters | 350/520 |

FOREIGN PATENT DOCUMENTS

1172051  11/1969  United Kingdom ............ 350/520

Primary Examiner—Jon W. Henry
Attorney, Agent, or Firm—Fleit, Jacobson, Cohn, Price, Holman & Stern

[57] ABSTRACT

Auxiliary lens cylinders constituting a tele-or wide-conversion lens system can be held in and away from the front of the objective lenses of a binocular telescope, so that the main lens system of the binocular telescope can be converted to a highly magnifying tele-conversion or wide-conversion system without influencing the position of image obtained with the main lens system.

5 Claims, 8 Drawing Sheets

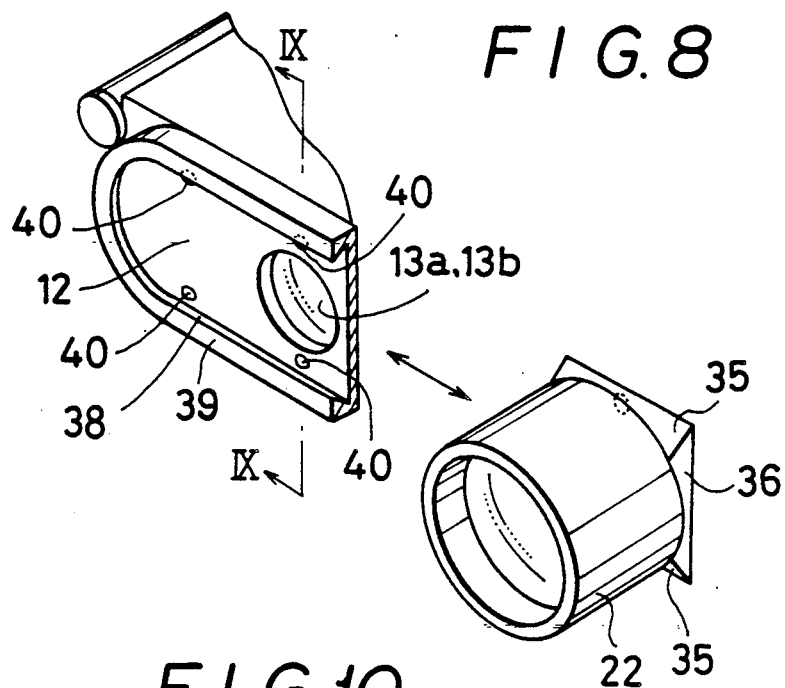
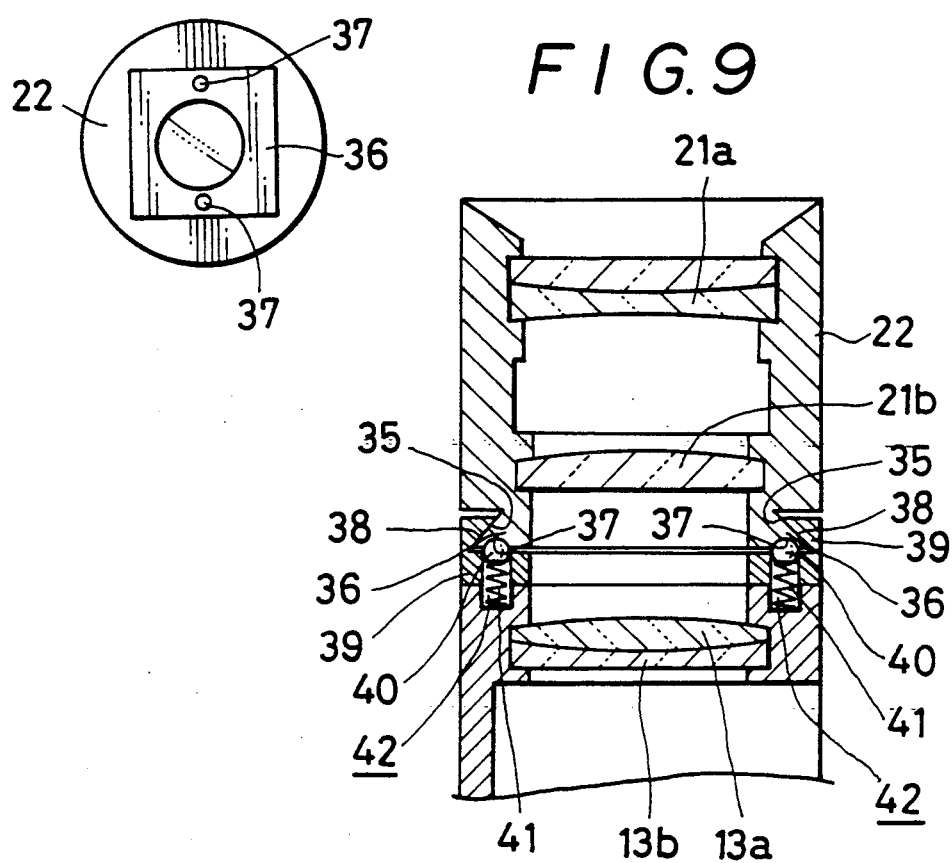

BINOCULAR TELESCOPE WITH AUXILIARY LENS SYSTEM

BACKGROUND OF THE INVENTION

(1) Field of the Invention

This invention relates to an auxiliary lens system for a binocular telescope, in which auxiliary lens cylinders accommodating tele-or wide-conversion lenses for tele- or wide-converting the main lens system can be held in or away from the front of the objective lenses of the binocular telescope. More specifically, the invention concerns an auxiliary lens system for binocular telescope, which is provided with a role of auxiliary lenses for converting the focal distances in two stages to that of tele-or wide-conversion lenses without influencing the position of image obtained with the main lens system.

(2) Prior Art

A prior art binocular telescope, of either poroprism type or dahaprism type, is not provided with auxiliary lenses which can convert the focal distance in two stages without influencing the position of image obtained by the main lens system.

In other words, with the prior art binocular telescope only a telescopic image of a preset magnification can be obtained, and it is impossible to enjoy telescopic observation of tele-or wide-converted focused images of higher magnifications.

SUMMARY OF THE INVENTION

The present invention seeks to provide an auxiliary lens system for a binocular telescope, in which auxiliary lens cylinders constituted by tele-or wide-conversion lenses for tele-or wide-converting the main lens system can be held in and away from the front of the objective lenses of a binocular telescope.

More specifically, it is a primary object of the invention to provide an auxiliary lens system for a binocular telescope, which can tele-and wide-convert the main lens system.

Another object of the invention is to provide an auxiliary lens system for a binocular telescope, in which the auxiliary lens cylinders can be held in and away from the front of the objective lenses of a binocular telescope so that it permits telescopic observation of an image with an ordinary binocular telescope when the auxiliary lens cylinders are not used.

A further object of the invention is to provide an auxiliary lens system for a binocular telescope, which permits conversion of the focal distance in two stages without influencing the position of image obtained by the main lens system.

A still further object of the invention is to provide an auxiliary lens system for a binocular telescope, which can be used for a binocular telescope of either poroprism type or dahaprism type.

The above and other objects and novel features of the invention will become more completely apparent from the following descriptions of the preferred embodiments when the same is read with reference to the accompanying drawings. The drawings, however, are for the purposeo of illustration only and by no means limitative of the invention.

BRIEF DESCRIPTION OF THE DRAWINGS

FIGS. 1 to 4 show a first embodiment of the auxiliary lens systemn according to the invention applied to a poroprism type binocular telescope, in which:

FIG. 1 is a perspective view showing a binocular telescope before auxiliary lens cylindeprs are set in front of objective lens systems;

FIG. 2 is a plan view in one half and a sectional view in the other half showing the state shown in FIG. 1;

FIG. 3 is a view similar to FIG. 2 but showing the binocular telescope with the auxiliary lens cylinders set in front of the objective lenses; and FIG. 4 is a fragmentary enlarged-scale sectional view for explaining a mechanism for causing rotation of each auxiliary lens cylinder;

FIGS. 5 to 11 show a second embodiment of the auxiliary lens system according to the invention applied to a dahaprism type binocular telescope, in which:

FIG. 5 is a perspective view showing a binocular telescope with auxiliary lens cylinders set in front of objective lenses;

FIG. 6 is a plan view in one held and a sectional in the other half showing the state shown in FIG. 5;

FIG. 7 is a view similar to FIG. 6 but showing the binocular telescope before setting the auxiliary lens cylinders in front of the objective lenses;

FIG. 8 is a fragmentary exploded perspective view showing an auxiliary lens cylinder and a cover plate before being assembled;

FIG. 9 is an enlarged-scale sectional view taken along line IX—IX in FIG. 8;

FIG. 10 is a bottom view showing the auxiliary lens cylinder; and

FIG. 11 is an enlarged-scale sectional view for explaining an auxiliary lens cylinder click stop mechanism; and FIGS. 12 and 13 show further embodiments of the auxiliary lens system according to the invention adaptable for a binocular telescope of either poroprims type or dahaprism type, in which:

FIG. 12 is a fragmentary exploded perspective view showing an embodiment, in which an auxiliary lens cylinder is mounted in front of an objective lens system by a bayonet system; and FIG. 13 is a view similar to FIG. 12 but showing an embodiment, in which an auxiliary lens cylinder is mounted in front of an objective lens system by a screw system.

DESCRIPTION OF THE PREFERRED EMBODIMENTS

Figure 1:
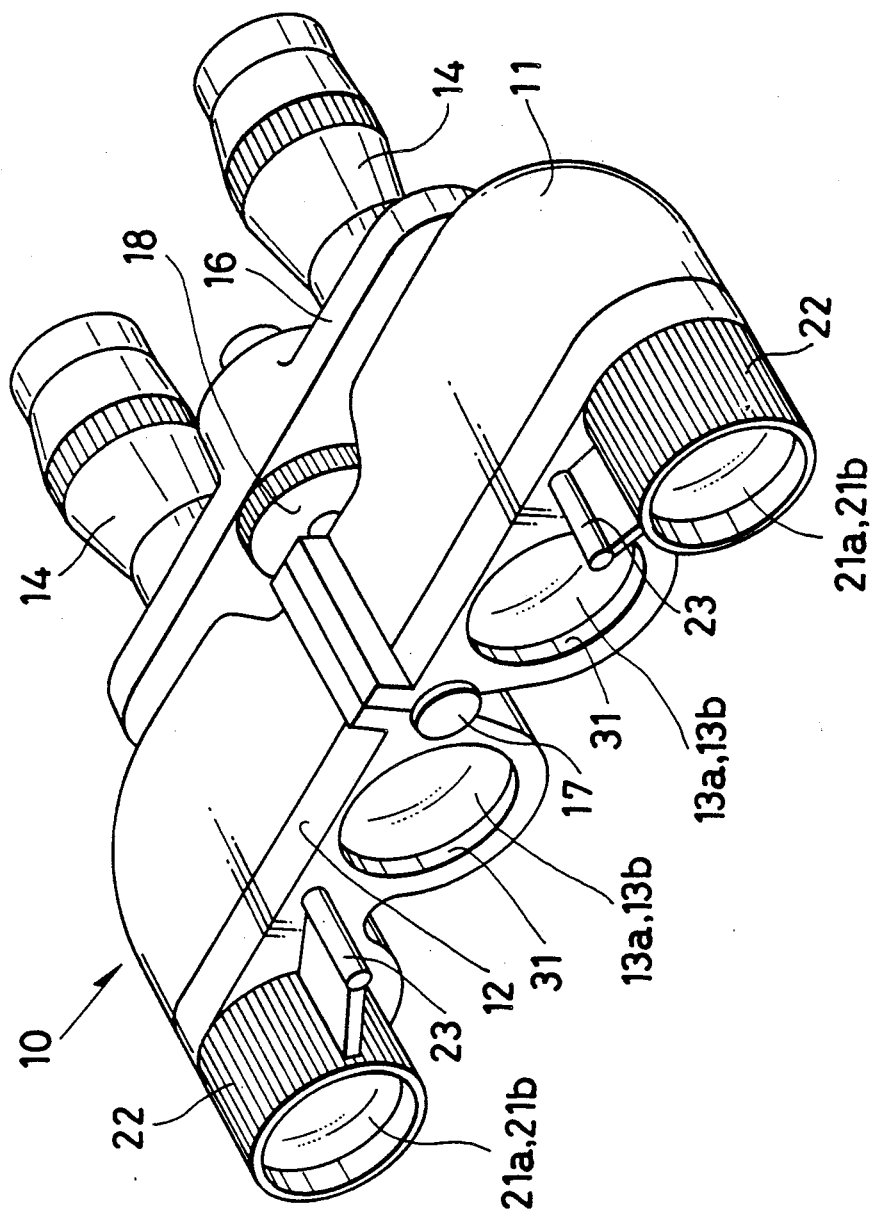
Figure 2:
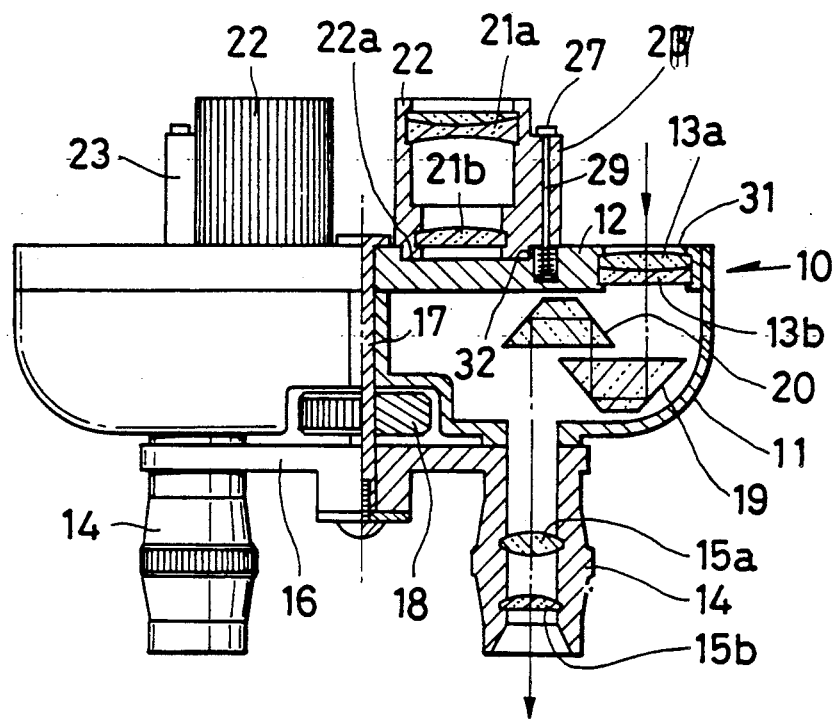
Figure 3:
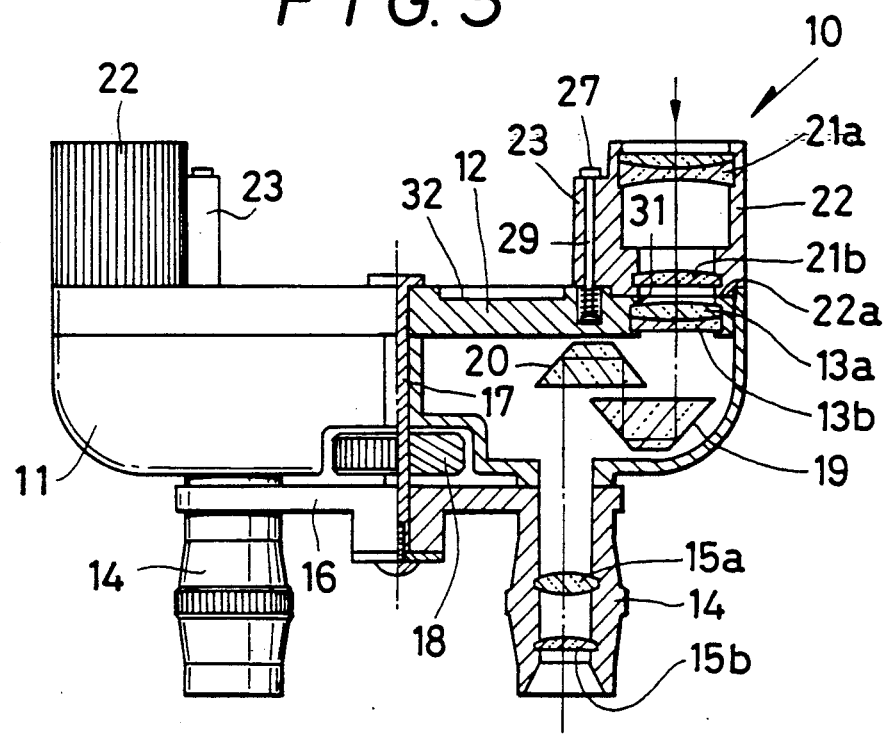
Figure 4:
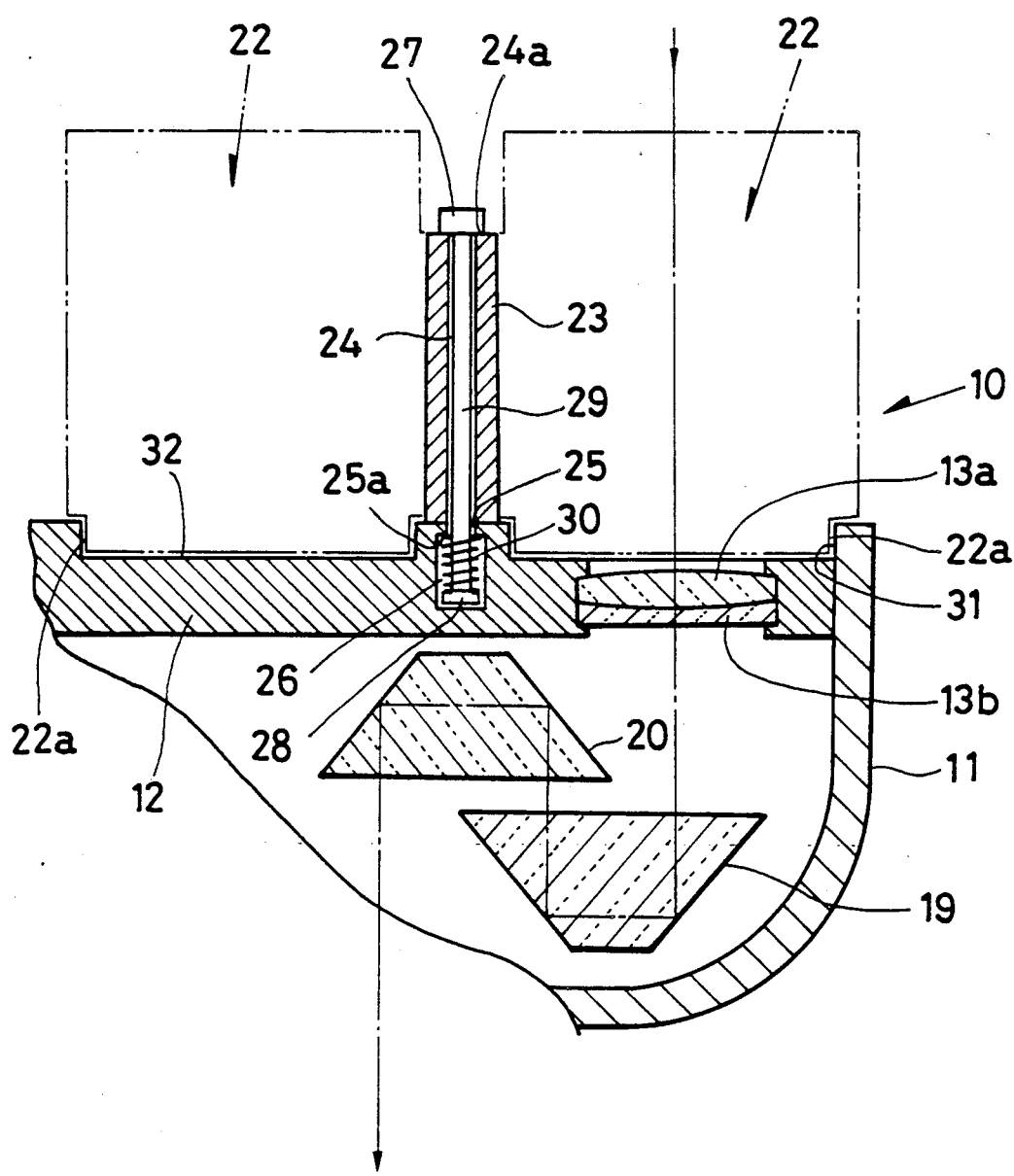
Figure 5:
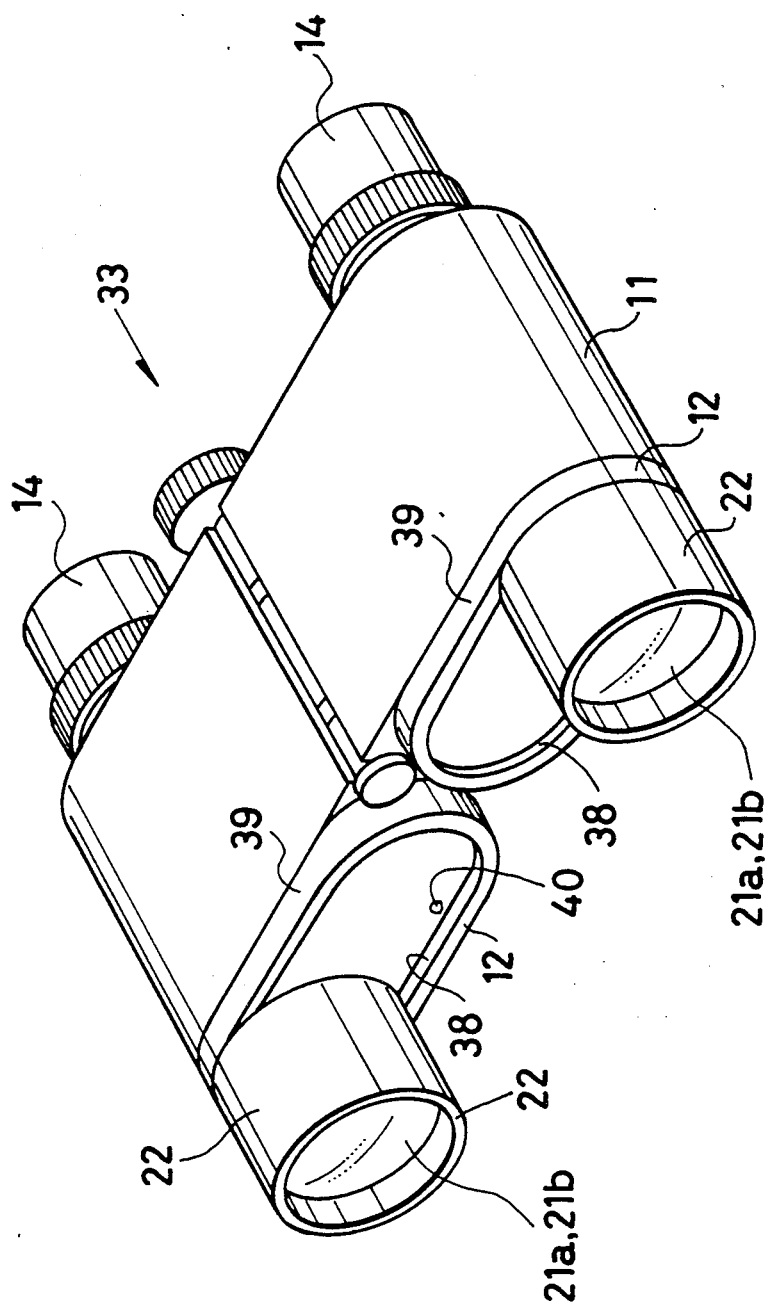
Figure 6:
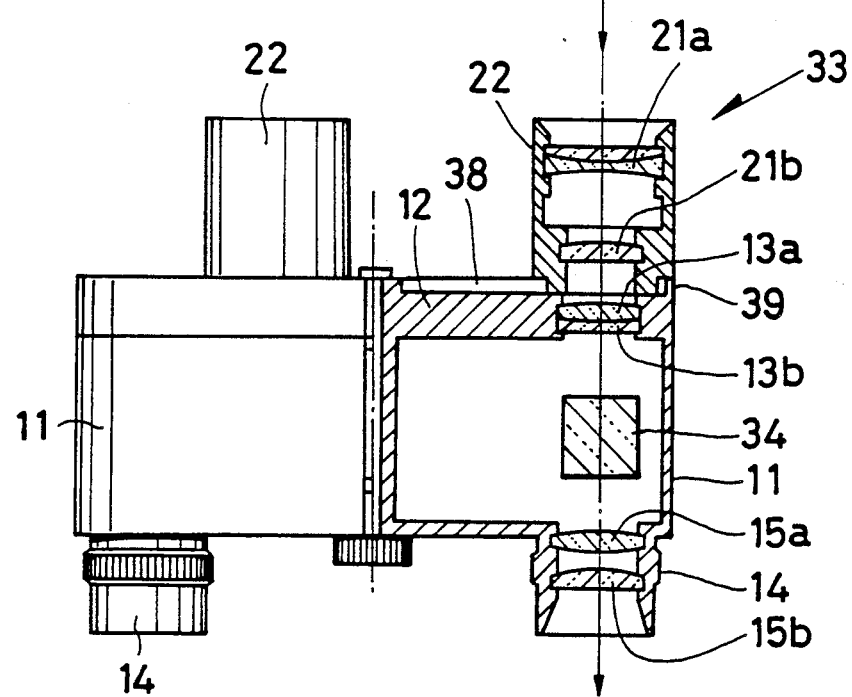
Figure 7:
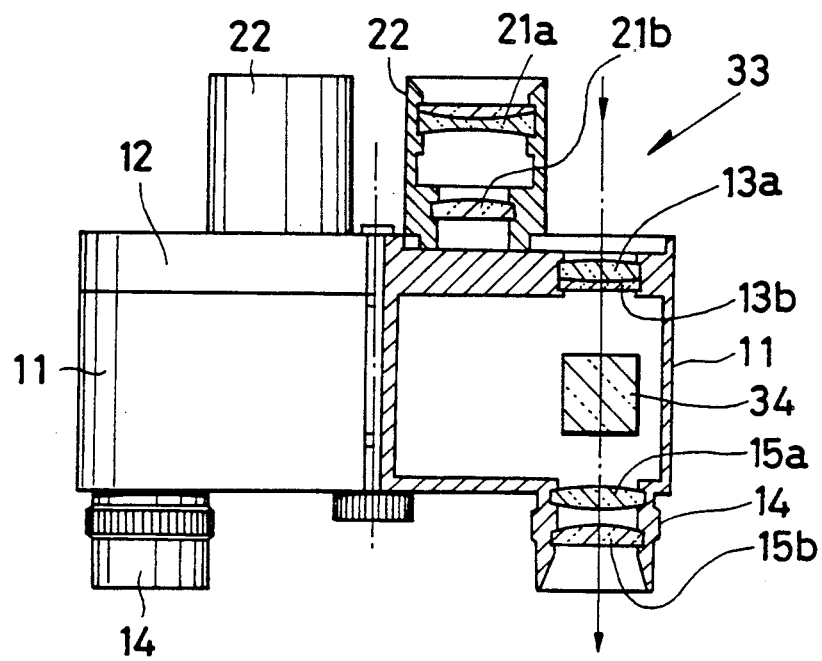
Figure 11:
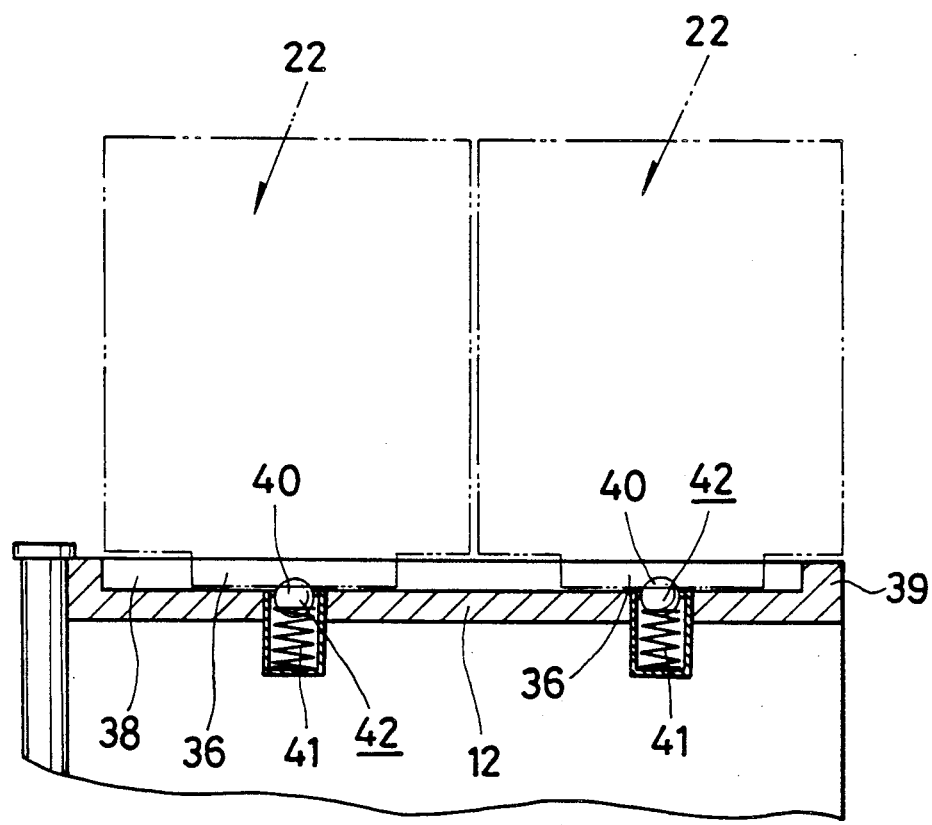

The auxiliary lens system according to the invention may be adopted for a binocular telescope of either poroprism type of dahaprism type (H type).

FIGS. 1 to 4 show one embodiment of the invention applied to a binocular telescope of poroprism type.

Referring to FIGS. 1 to 4, there is shown the binocular telescope 10 of poroprism type. A cover plate 12 is secured to the front of a body 11 of the binocular telescope 10. Left and right objective lens systems 13a and 13b are accommodated in the body 11. Two eyepiece lens cylinders 14 are mounted at a predetermined distance from each other on the back of the body 11. These eyepiece lens cylinders 14 accommodate respective eyepiece lens systems 15a and 15b, and they are coupled to each other by a bridge 16 such that they are interlocked to each other. A focus adjustment shaft 17 penetrates the center of the bridge 16 and body 11. A focus adjustment ring 18 is mounted on the shaft 17. By turning the focus adjustment ring 18, the eyepiece lens cylinders 14 are moved back and forth via the bridge 16 for adjustment of the focal distance.

In the body 11, first and second 45-degree depression angle prisms 19 and 20 are provided along the axis of each of the objective lens systems 13a and 13b. The first 45-degree depression angle prism 19 causes 180-degree diffraction of the axis of each objective lens system 13a or 13b, and the second 45-degree depression angle prism 20 causes 180-degree diffraction of the first 45-degree depression angle prism 19 into coincidence with the axis of each eyepiece lens system 15a or 15b.

In front of the objective lens systems 13a and 13b provided inside the cover plate 12, there are provided respective conversion lens systems 21a and 21b. These conversion lens systems constitute a tele-conversion or wide-conversion lens system for tele-converting or wide-converting the main lens system consisting of the objective and eyepiece lens systems 13a, 13b, 15a and 15b. The conversion lens systems 21a and 21b are accommodate in auxiliary lens cylinders 22, which serve as an auxiliary lens system to the main lens system for converting the focal distance in two stages. The auxiliary lens cylinders 22 are rotably held in the inner side of the objective lens systems 13a and 13b, and they are adapted to be rotatably brought to the front of the objective lens systems 13a and 13b when desired.

The construction of a first embodiment will now be described in greater detail.

Each auxiliary lens cylinders 22 has its outer periphery provided with an integral pivotal section 23 for mounting it on the cover plate 12. The pivotal section 23 has an axial thorough axial hole 24. Also, the cover plate 12 is provided at a position on the inner side of each of the objective lens systems 13a and 13b with a hole 25 of the same diameter as the thorough hole 25 such as to communicate with the thorough hole 25 and an increased-diameter hole 26 having a greater diameter than and communicating with the hole 25. A pin 29 having increased-diameter end portions 27 and 28 with a diameter greater than the diameter of the holes 24 and 25 and smaller than the diameter of the hole 26 loosely penetrates the holes 24 and 25, with one increased-diameter end portion loosely fitted in the hole 26. The other increased-diameter end portion 27 of the pin 29 engages with the front end of the thorough hole 24 of the pivotal section 23 to prevent further insertion of the pin 29 into the thorough hole 24. A compression coil spring 30 is fitted on a portion of the pin 29 between the increased-diameter end portion 28 in the hole 26 and a shoulder 25a at the front end of the hole 25, and it biases the pin 29 backwardly. Each auxiliary lens cylinder 22 is rotatable about the pin 29 to a position in front of each objective lens system 13a or 13b.

In order that each auxiliary lens cylinder 22 be reliably brought to the front of each of the objective lens systems 13a and 13b without swinging or rocking, it is recommended to provide the front of each of the objective lens systems 13a and 13b with a depression, in which a reduced-diameter stem portion 22a of the auxiliary lens cylinder 22 can be received. It is also recommended to provide a portion of the cover plate 12 corresponding to each auxiliary lens cylinder 22 with a depression 32, in which the reduced-diameter stem 22a of the auxiliary lens cylinder 22 can be received when the auxiliary lens cylinder is not brought to the position in front of each of the objective lens systems 13a and 13b.

To bring each auxiliary lens cylinder 22 to be in front of the objective lens systems 13a and 13b, the auxiliary lens cylinder 22 is pulled forwardly together with the pin 29 against the force of the compression coil spring 30 to get the reduced-diameter stem 22a out of the depression 32. In this state, the auxiliary lens cylinder 22 is turned about the pin 29 toward each of the objective lens systems 13a and 13b. When the auxiliary lens cylinder 22 is brought to be in front of each of the objective lens systems 13a and 13b, it is released, whereupon the increased-diameter end portion 28 of the pin 29 is forced backwardly to cause a backward displacement of the pin 29. At the same time, the other increased-diameter end portion 27 backwardly pushes the front end 24a of the pivotal section 23, i.e., the auxiliary lens cylinder 22 to let the reduced-diameter stem tehereof be received in the depression 31. In this way, each auxiliary lens cylinder 22 is held in front of each of the objective lens systems 13a and 13b. In addition to the engagement of its reduced-diameter stem 22a in the depression 31, the auxiliary lens cylinder 22 is secured to the front of each the objective lens systems 13a and 13b accurately and such that it is free from swinging by the biasing force of the compression coil spring 30.

In this way, the axes of the auxiliry lens cylinders 22 can be brought into coincidence with those of the main lens system to obtain a highly magnified tele-converted or wide-converted image.

The auxiliary lens cylinders 22 may be removed from their positions in front of the objective lens systems 13a and 13b in a converse way to the operation described above. This operation thus is not described. With the stems 22a of the auxiliary lens cylinders 22 received in the depressions 32, an image of an ordinary binocular telescope can be obtained.

FIGS. 5 to 11 show a second embodiment of the invention applied to a binocular telescope of dahaprism type.

Referring to FIGS. 5 to 11, there is shown the binocular telescope of dahaprism type. A cover plate 12 is secured to the front of a body 11 of this binocular telescope. Left and right objective lens systems 13a and 13b are accommodated in the body 11. Two eyepiece lens cylinders 14 accommodating respective eyepiece lens systems 15a and 15b are mounted at a predetermined distance from each other in a portion of the body in front of respective dahaprisms 34 disposed in the body 11. In this second embodiment, auxiliary lens cylinders 22 are provided on the inner side of objective lens systems 13a and 13b and adapted to be moved to positions in front of the objective lens systems 13a and 13b.

The construction of the second embodiment will now be described in greater detail.

The stem of each auxiliary lens cylinder 22 has upper and lower integral projections 36 having oblique surfaces 35. The back surface of each projection 36 is formed with a central semi-circular hole 37. The cover plate 12, on the other hand, is provided with a guide 39, which co-operates with the projections 36. More specifically, the guide 39 has oblique surfaces 38 to be in contact with and guide the oblique surfaces 35 of the projections 36. Further, in order that each auxiliary lens cylinder 22 be stopped reliably at a predetermined position after movement to the left or right, a click stop mechanism 42 is provided. More sipecifically, the cover plate 12 is provided at left and right, upper and lower positions with holes, in which respective steel balls 40 biased by coil springs 41 are received such that these steel balls slightly project from them. The steel balls 40 are adapted to be engaged in the semi-circular holes 37. The auxiliary lens cylinder 22 is movable to the left and right with the projections 36 in engangement with the guide 39.

With this construction, by forcibly moving the auxiliary lens cylinder 22 with the projections 36 in engagement with the guide 39 in a predetermined lateral direction, it is released from the click stop mechanism 42 at one position. In the click stop mechanism at the other position, the steel balls 40 are engaged in the semicircular holes 37, whereby the auxiliary lens cylinder 22 is set at the desired position.

Figure 12:
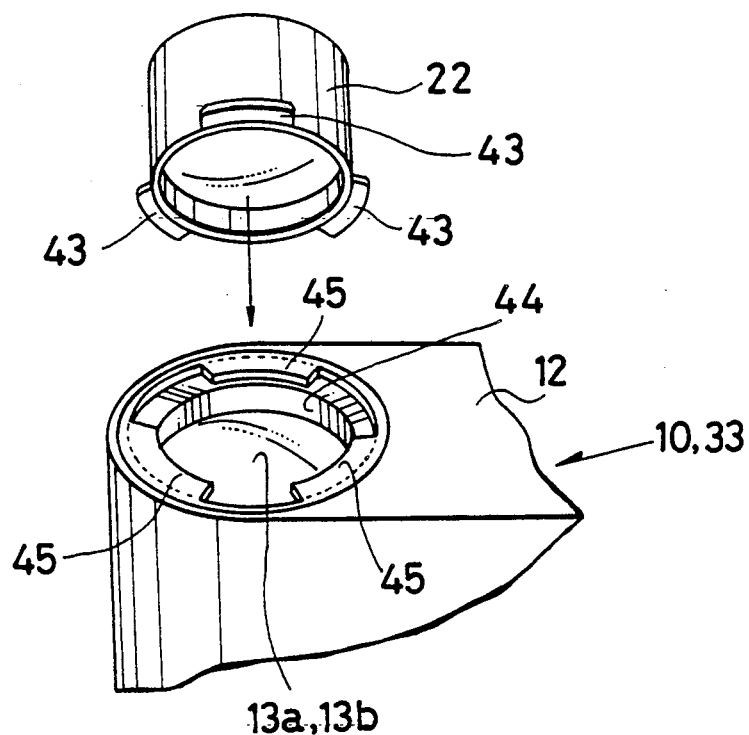
Figure 13:
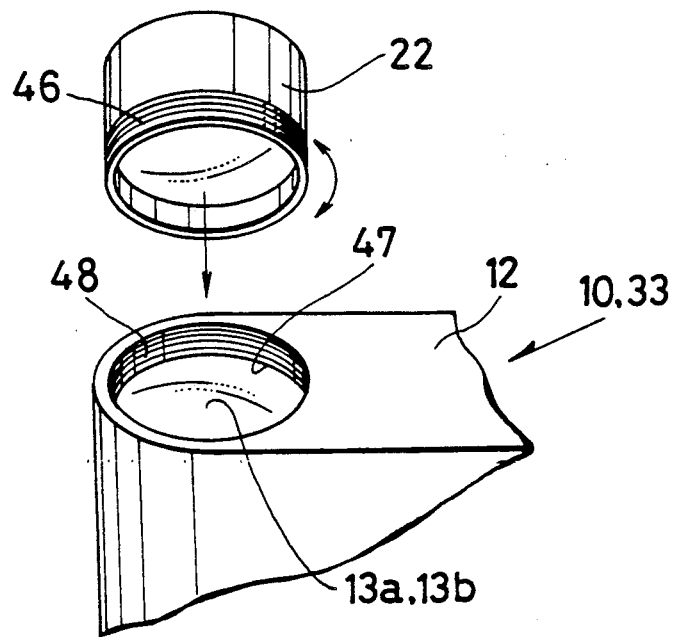

FIGS. 12 and 13 show further embodiments of the auxiliary lens system according to the invention, which are applicable to a binocular telescope of either poroprism or dahaprism type.

While in the first and second embodiments the auxiliary lens cylinders are movably mounted on the cover plate, in the structures shown in FIGS. 12 and 13 the auxiliary lens cylinders are removably mounted on the cover plate.

The embodiment shown in FIG. 12 is of bayonet type, in which the auxiliary lens cylinders 22 can be mounted in front of the objective lens systems 13a and 13b with a slight rotational angle. More specifically, the stem of each auxiliary lens cylinder 22 has a plurality of uniformly spaced-apart, radially outer protuberances 43. On the other hand, the cover plate 12 of poroprism type binocular telescope scope 10 or dahaprism type binocular telescope 33 has hook pieces 45 provided in number equal to the number of the protuberances 45 and uniformly spaced-apart. These hook pieces 45 project inwardly from the peripheral wall of a depression provided in front of each of the objective lens systems 13a and 13b. To mount the auxiliary lens cylinder 22 on the cover plate 12, it is held with the protuberances 43 positioned between adjacent ones of the hook pieces 45 of the cover plate 12 at the associated depression 44. In this state, the auxiliary lens cylinder 22 is turned in either direction to bring the protuberances 43 into contact with the inner surfaces of the hook pieces 45. In this way, the auxiliary lens cylinder 22 is mounted. It can be removed in a converse way.

The embodiment shown in FIG. 13 is of screw type, in which each auxiliary lens cylinder 22 is screwedly secured to the front of each of the objective lens systems 13a and 13b. More specifically, the outer periphery of the stem of the auxiliary lens cylinder 22 is formed with a male thread 46. On the other hand, the inner periphery of a depression 44 formed in the cover plate of poroprism type binocular telescope 10 or dahaprism type binocular telescope 33 is formed with a female thread 48, in which the male thread 46 is screwed. The auxiliary lens cylinder 22 can be mounted on the cover plate 12 by screwing the male thread 46 in the female thread 48. It can be removed in the converse way.

As has been described in the foregoing, the auxiliary lens cylinbders constituting a tele-conversion or wide-conversion lens system can be held in and out of front of the objective lenses of a binocular telescope. Thus, the user can enjoy a highly magnified tele-converted or wide-converted image by using the auxiliary lenses when desired. When the auxiliary lenses are unnecessary, the auxiliary lens cylinders are moved or removed from the front of the objective lenses to enjoy telescopic observation with an ordinary binocular telescope.

Various changes and modifications in the details of the above embodiments obviously can be made without departing from the scope and spirit of the invention, and hence the above embodiments are by no means limitative other than what is defined in the claims.

What is claimed is:

1. A binocular telescope having an auxiliary lens system comprising auxiliary lens cylinders constituting a tele-or wide conversion lens system, and means for removably holding said auxiliary lens cylinders in front of each of a left and right objective lens system of the telescope.

2. The telescope according to claim 1, which includes means for rotating said auxiliary lens cylinders to positions in front of said objective lens systems.

3. The telescope according to claim 1, which includes means for sliding said auxiliary lens cylinders to positions in front of said objective lens systems and for holding the lens cylinders in positions by a click stop mechanism.

4. The telescope according to claim 1, which includes a bayonet system for removably mounting said auxiliary lens cylinders in front of said objective lens systems.

5. The telescope according to claim 1, which includes a screw system for removably mounting said auxiliary lens cylinders in front of said objective lens systems.

* * * * *